US012424034B2

(12) United States Patent
Wu

(10) Patent No.: US 12,424,034 B2
(45) Date of Patent: Sep. 23, 2025

(54) VEHICLE CONTROL SYSTEM AND VEHICLE CONTROL METHOD THEREOF

(71) Applicant: INDUSTRIAL TECHNOLOGY RESEARCH INSTITUTE, Hsinchu (TW)

(72) Inventor: Ming-Xuan Wu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 143 days.

(21) Appl. No.: 18/394,801

(22) Filed: Dec. 22, 2023

(65) Prior Publication Data

US 2025/0209866 A1 Jun. 26, 2025

(51) Int. Cl.
*G07C 5/02* (2006.01)

(52) U.S. Cl.
CPC ........................ *G07C 5/02* (2013.01)

(58) Field of Classification Search
CPC ........................ G07C 5/02
See application file for complete search history.

(56) References Cited

U.S. PATENT DOCUMENTS 10,737,717 B2 8/2020 Peng et al.
10,899,349 B2 1/2021 Voorheis
11,318,936 B2 5/2022 Giorelli et al.
2014/0278052 A1* 9/2014 Slavin ................ G01C 21/3492 701/400
2018/0297578 A1* 10/2018 Park ................ B60K 6/485
2021/0188350 A1 6/2021 Choi
2023/0174059 A1 6/2023 Ivanovic et al.
2023/0259127 A1* 8/2023 Hirano ................ G05D 1/2248 701/2
2023/0286536 A1 9/2023 Belman et al.

FOREIGN PATENT DOCUMENTS

CN 116257597 A 6/2023
CN 116803793 A 9/2023
CN 116929413 A 10/2023
TW 201819223 A 6/2018
TW 202132803 A 9/2021

(Continued)

OTHER PUBLICATIONS

Australian Office Action for Australian Application No. 2024201599, dated Mar. 28, 2025.

(Continued)

*Primary Examiner* — Behrang Badii
(74) *Attorney, Agent, or Firm* — Birch, Stewart, Kolasch & Birch, LLP

(57) ABSTRACT

A vehicle control system includes a vehicle state estimator, a delay simulator and an error compensation optimizer. The vehicle state estimator is configured to generate an estimated future vehicle state at a future time point. The delay simulator is configured to determine a delay time based on the estimated future vehicle state and a current vehicle state, and obtain a delayed future vehicle state based on the delay time. The error compensation optimizer is configured to generate a driving parameter estimation compensation to the vehicle state estimator based on a difference between the delayed future vehicle state and a target vehicle state being outside the error range.

16 Claims, 4 Drawing Sheets

(56) References Cited

FOREIGN PATENT DOCUMENTS

| | | | |
|---|---|---|---|
| WO | WO 2020/152977 | A1 | 7/2020 |
| WO | WO 2023/057122 | A1 | 4/2023 |

OTHER PUBLICATIONS

Taiwanese Office Action and Search Report for Taiwanese Application No. 112150292, dated Sep. 30, 2024.

Flores et al., "Robust Preview-Based Tractor-Trailer Lateral Control for Lane Keeping," 2020 American Control Conference, Denver, CO, USA, Jul. 1-3, 2020, pp. 1229-1234.

Heide et al., "Banked road estimation and compensation algorithm for Lane Keeping Assist and its integration in GM's Software Architecture," Automotive meets Electronics, 2017, pp. 38-42.

Madhavan Rathai et al., "Robust tube—MPC based lane keeping system for autonomous driving vehicles," AIR '17: Advances in Robotics, New Delhi, India, Jun. 28-Jul. 2, 2017, pp. 1-6.

Quan et al., "Linear Parameter Varying Models-Based Gain-Scheduling Control for Lane Keeping System With Parameter Reduction," IEEE Transactions on Intelligent Transportation Systems, vol. 23, No. 11, 2022, pp. 20746-20756.

Xu et al., "Design and Experiments of Safeguard Protected Preview Lane Keeping Control for Autonomous Vehicles," IEEE Access, vol. 8, 2020, pp. 29944-29953.

Yamamoto et al., "Robust Control for Automated Lane Keeping against Lateral Disturbance," Proceedings 1991 IEEE/IEEJ/JSAI International Conference on Intelligent Transportation Systems, Tokyo, Japan, 1999, pp. 240-245.

* cited by examiner

VEHICLE CONTROL SYSTEM AND VEHICLE CONTROL METHOD THEREOF

TECHNICAL FIELD

The disclosure relates in general to a vehicle control system and vehicle control method thereof.

BACKGROUND

The road conditions for automobiles transportation varies, such as a slope of the road, a left and right inclination, a curvature of the turning road, a road surface damage, etc. Usually, the driving of vehicles on variable road surfaces are prone to deviating from an expected driving route. Therefore, proposing a vehicle control system capable of coping with the aforementioned circumstance is required.

SUMMARY

According to one embodiment, a vehicle control system is provided. The vehicle control system is disposed on a vehicle. The vehicle control system includes a vehicle state estimator, a delay simulator and an error compensation optimizer. The vehicle state estimator is configured to generate an estimated future vehicle state of a future time point. The delay simulator configured to determine a delay time according to the estimated future vehicle state and a current vehicle state; and obtain a first delayed future vehicle state according to the delay time. The error compensation optimizer is configured to generate a driving parameter estimation compensation based on a difference between the first delayed future vehicle state and a target vehicle state that is outside an error range and transmit the driving parameter estimation compensation to the vehicle state estimator.

According to another embodiment, a vehicle control method of a vehicle control system is provided. The vehicle control method includes the following steps: generating an estimated future vehicle state of a future time point by a vehicle state estimator; determining a delay time according to the estimated future vehicle state and a current vehicle state by a delay simulator; obtaining a first delayed future vehicle state according to the delay time by the delay simulator; and generating a driving parameter estimation compensation based on a difference between the first delayed future vehicle state and a target vehicle state that is outside an error range and transmit the driving parameter estimation compensation to the vehicle state estimator by an error compensation optimizer.

The above and other aspects of the disclosure will become better understood with regard to the following detailed description of the preferred but non-limiting embodiment(s). The following description is made with reference to the accompanying drawings.

DETAILED DESCRIPTION

Figure 1:
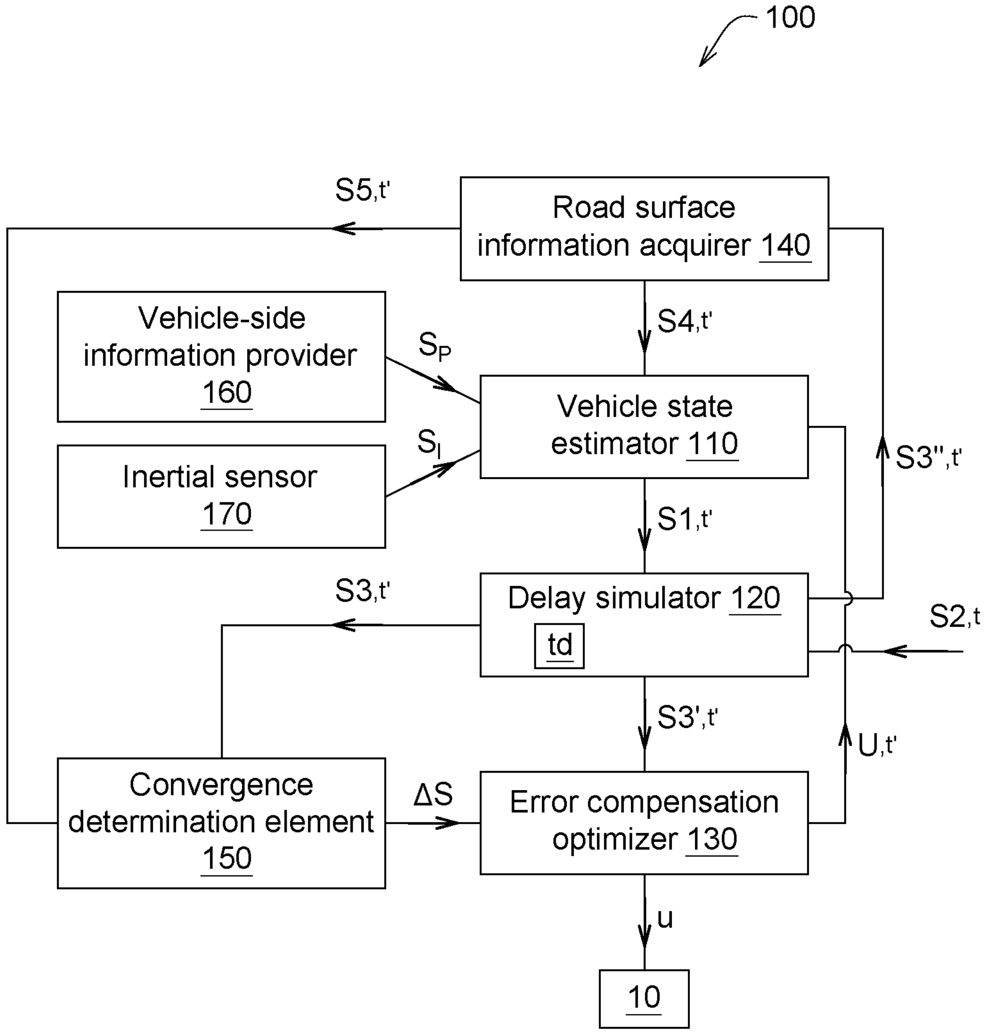
FIG. 1 illustrates a functional block diagram of a vehicle control system according to an embodiment of the present disclosure.

Referring to FIG. 1, FIG. 1 illustrates a functional block diagram of a vehicle control system 100 according to an embodiment of the present disclosure. The vehicle control system 100 includes a vehicle state estimator 110, a delay simulator 120, an error compensation optimizer 130, a road surface information acquirer 140, a convergence determination element 150, a vehicle-side information provider 160 and an inertial sensor 170. The vehicle control system 100 may be disposed on a vehicle (not shown). For example, the vehicle includes at least one wheel and a driving system, wherein the driving system may drive the wheels to rotate so that the vehicle may move on the road. The driving system may operate by, for example, electricity, fuel or a combination thereof. In addition, the vehicle also includes a steering wheel system, an accelerator system, a braking system and other system to control the vehicle's steering and speed. In an embodiment, the vehicle may be a truck, but the disclosed embodiments are not limited.

In an embodiment, at least two of the vehicle state estimator 110, the delay simulator 120, the error compensation optimizer 130, the road surface information acquirer 140 and the convergence determination element 150 may be integrated into a single unit. Alternatively, at least one of the vehicle state estimator 110, the delay simulator 120, the error compensation optimizer 130, the road surface information acquirer 140, the convergence determination element 150 and the vehicle-side information provider 160 may be integrated into a processor or a controller. At least one of the vehicle state estimator 110, the delay simulator 120, the error compensation optimizer 130, the road surface information acquirer 140, the convergence determination element 150 and the vehicle-side information provider 160 may be a physical circuits, such as a semiconductor chip or a semiconductor device package, formed by using at least one semiconductor process, for example. The inertial sensor 170 may sense a three-axis angular velocity and a three-axis acceleration of the vehicle. Furthermore, the inertial sensor 170 is, for example, a gyroscope.

As shown in FIG. 1, the vehicle state estimator 110 is configured to generate an estimated future vehicle state S1$_{,t'}$ at the t'-th future time point. The delay simulator 120 is configured to: determine a delay time td based on the estimated future vehicle state S1$_{,t'}$ and a current vehicle state S2$_{,t'}$; and obtain a first delayed future vehicle state S3$_{,t'}$ based on the delay time td. The error compensation optimizer 130 is configured to generate a driving parameter estimation compensation U$_{,t'}$ for the vehicle state estimator 110 based on a difference between the first delayed future vehicle state S3, and a target vehicle state S5$_{,t'}$ which is outside an error range. Through the driving parameter estimation compensation U$_{,t'}$, the vehicle state estimator 110 may generate the updated estimated future vehicle state S1$_{,t'}$ at the t'-th future time point, so that the vehicle approaches the expected control on the vehicle.

The subscript t' of the symbols in the present disclosure represents a future time point, wherein the value of t' is a positive integer between 1 and N, and N is, for example, a positive integer equal to or greater than 1. In addition, the vehicle state estimator 110 may use, for example, a Kalman filter to estimate the future vehicle state, but the embodiment of the present disclosure is not limited thereto.

In an embodiment, the vehicle state estimator 110 generates an estimated future vehicle state group S1 which includes a plurality of the estimated future vehicle states at a plurality of future time points. The set may be expressed as: $S1=[S1_{,1}, S1_{,2}, \ldots, S1_{,t'}, \ldots, S1_{,N}]$, wherein N is the number of time points. For example, in case of once sampling per second and lasting for 10 seconds, the value of N is 10 and a time interval between the two adjacent estimated future vehicle states $S1_{,t'+1}$ and $S1_{,t'}$ is 1 second (i.e., $S1_{,t'+1}-S1_{,t'=1}$). The delay simulator 120 calculates all estimated future vehicle states $S1_{,t'}$ one by one to obtain the corresponding first delayed future vehicle state $S3_{,t'}$. The delay simulator 120 may calculate the estimated future vehicle state $S1_{,t'}$, by using an appropriate mathematical method or a circuit design, to obtain the corresponding first delayed future vehicle state $S3_{,t'}$; however, it is not limited by the embodiment of the present disclosure.

In an embodiment, the current vehicle state $S2_{,t}$, is, for example, the vehicle state calculated at the current time (for example, in the iteration). The current vehicle state $S2_{,t}$ includes, for example, at least one parameter, for example, at least one of a current vehicle position $P_t$ at the current time point t (expressed by $(X_t, Y_t, Z_t)$), a current three-axis angular velocity $\dot{\omega}_t$ (expressed by $(\dot{\phi}t, \dot{\psi}t, \dot{\sigma}t)$), a current three-axis acceleration $A_t$ (expressed by $(At_x, At_y, At_z)$), a current three-axis angle $\omega_t$ (expressed by $(\varphi t, \psi t, \theta t)$) and a current vehicle speed $V_t$. The current vehicle state $S2_{,t}$ is, for example, a reference coordinate system (X, Y, Z), wherein $X_t$ is, for example, the value of X-axis, $Y_t$ is, for example, the value of Y-axis, and $Z_t$ is, for example, the value of Z-axis, $AC_x$ is, for example, the acceleration value along the X-axis, $AC_y$ is, for example, the acceleration value along the Y-axis, $AC_z$ is, for example, the acceleration value along the Z-axis, $\phi t$ is, for example, the angle value around the X-axis, $\psi t$ is, for example, the angle value around the Z-axis, and $\theta t$ is, for example, the angle value around the Y-axis, $\dot{\phi}t$ is, for example, the angular velocity value around the X-axis, $\dot{\psi}t$ is, for example, the angular velocity value around the Z-axis, $\dot{\theta}t$ is, for example, the angular velocity value around the Y-axis, and the current vehicle speed $V_t$ is the speed value of the velocity. The estimated future vehicle state $S1_{,t'}$ includes, for example, at least one parameter, for example, at least one of an estimated vehicle position P1 (expressed as (X1, Y1, Z1)) at the t'-th future time point, an estimated three-axis angular velocity $\dot{\omega}1$ (expressed by $(\dot{\phi}1, \dot{\psi}1, \dot{\theta}1)$), an estimated acceleration A1 (expressed by $(A1_x, A1_y, A1_z)$), an estimated vehicle attitude $\omega1$ (expressed by $(\phi1, \psi1, \theta1)$) and an estimated vehicle speed V1. The estimated future vehicle state $S1_{,t'}$ is, for example, referring to a coordinate system (X, Y, Z), wherein X1 is, for example, the value of the X-axis, Y1 is, for example, the value of the Y-axis, Z1 is, for example, the value of the Z-axis, $A1_x$ is, for example, the acceleration value along the X-axis, $A1_y$ is, for example, the acceleration value along the Y-axis, $A1_z$ is, for example, the acceleration value along the Z-axis, $\phi1$ is the angle value around the X-axis, $\psi1$ is the angle value around the Z-axis, $\theta1$ is the angle value around the Y-axis, $\dot{\phi}1$ is, for example, the angular velocity value around the X-axis, $\dot{\psi}1$ is, for example, the angular velocity value around the Z-axis, and $\dot{\theta}1$ is, for example, the angular velocity value around the Y-axis. The estimated future vehicle state $S1_{,t'}$ at each future time point is, for example, the estimated future vehicle state based on the current vehicle state $S2_{,t}$, which may be optimized through at least one iterative calculation process (it will be described later) to make each estimated future vehicle state $S1_{,t'}$ approach the target vehicle state $S5_{,t'}$.

In an embodiment, the first delayed future vehicle state $S3_{,t'}$ includes, for example, at least one parameter, for example, a delayed vehicle position P3 (expressed by (X3, Y3, Z3)) and the delayed vehicle speed V3. The first delayed future vehicle state S3,t' is, for example, the reference coordinate system (X, Y, Z), where X3 is, for example, the value of the X-axis, Y3 is, for example, the value of the Y-axis, and Z3 is, for example, the value of the Z-axis, and the delayed vehicle speed V3 is, for example, the speed value of the vehicle. The delay simulator 120 may make the estimated future vehicle state $S1_{,t'}$ more consistent with the actual operating state of the vehicle. Furthermore, during the actual process of controlling the vehicle, when an accelerator pedal of the vehicle is stepped on, the vehicle does not accelerate immediately, but delays for a period of time (for example, within 1 second) before starting to accelerate. The delay simulator 120 may perform a delay operation on the estimated future vehicle state $S1_{,t'}$ according to the delay time td to obtain the first delayed future vehicle state $S3_{,t'}$ for being consistent with the actual delay situation of the vehicle. Taking the estimated vehicle speed V1 (belongs to one of the parameters of the estimated future vehicle state $S1_{,t'}$) at the t'-th future time point as an example, also at the t'-th future time point, the delayed vehicle speed V3 which is delayed by the delay simulator 120 is different from the estimated vehicle speed V1. For example, the delayed vehicle speed V3 is smaller than the estimated vehicle speed V1 (due to the delayed response of the accelerator, so the vehicle speed becomes smaller), but the delayed vehicle speed V3 is more consistent with or closer to the actual vehicle speed.

In addition, as shown in FIG. 1, the delay simulator 120 is further configured to perform a delay calculation on the estimated future vehicle state $S1_{,t'}$ to generate a second delayed future vehicle state $S3'_{,t'}$. The second delayed future vehicle state $S3'_{,t'}$ includes at least one parameter, for example, at least one of the delayed vehicle position P3 (expressed by (X3, Y3, Z3)), the delayed vehicle speed V3, an estimated three-axis angular velocity $\dot{\omega}3$ (expressed by $(\dot{\phi}3, \dot{\phi}3, \dot{\theta}3)$), an delayed acceleration A3 (expressed by $(A3_x, A3_y, A3_z)$) and a delayed vehicle attitude $\omega3$ (expressed by $(\phi3, \phi3, \theta3)$). The parameters included in the aforementioned first delayed future vehicle state $S3_{,t'}$ are, for example, one of some of the parameters included in the second delayed future vehicle state $S3'_{,t'}$. The second delayed future vehicle state $S3'_{,t'}$ is, for example, the reference coordinate system (X, Y, Z), wherein X3 is, for example, the value of the X-axis, Y3 is, for example, the value of the Y-axis, and Z3, for example, is the value of the Z-axis, $A3_x$ is, for example, the acceleration value along the X-axis, $A3_y$ is, for example, the acceleration value along the Y-axis, $A3_z$ is, for example, the acceleration value along the Z-axis, $\phi3$ is, for example, the angle value around the X-axis, $\psi3$ is, for example, the angle value around the Z-axis, $\theta3$ is, for example, the angle value around the Y-axis, $\dot{\phi}3$ is, for example, the angular velocity value around the X-axis, $\dot{\psi}3$ is, for example, the angular velocity value around the Z-axis, and $\dot{\theta}3$ is, for example, the angular velocity value around the Y-axis.

As shown in FIG. 1, the delay simulator 120 is further configured to output a third delayed future vehicle state $S3''_{,t'}$ to the road surface information acquirer 140. The third delayed future vehicle state $S3''_{,t'}$ includes, for example, at least one parameter, for example, the delayed vehicle position P3. The parameters included in the third delayed future vehicle state $S3''_{,t'}$ are, for example, one or some of the parameters included in the second delayed future vehicle state $S3'_{,t'}$. The road surface information acquirer 140 is further configured to: obtain the target vehicle state $S5_{,t'}$ at the t'-th future time point based on the third delayed future vehicle state $S3''_{,t'}$, wherein the target vehicle state $S5_{,t'}$ includes, for example, at least one parameter, for example, the vehicle target position P5 (expressed by (X5, Y5, Z5)) and the target vehicle speed V5.

As shown in FIG. 1, the delay simulator 120 is further configured to output the delayed vehicle position P3 of the third delayed future vehicle state $S3''_{,t'}$ to the road surface information acquirer 140. The road surface information acquirer 140 is further configured to obtain the target vehicle state $S5_{,t'}$ at the t'-th future time point based on the estimated vehicle position P1, wherein the target vehicle state $S5_{,t'}$ includes, for example, at least one parameter, for example, the vehicle Target position P5 and target vehicle speed V5. The target vehicle state $S5_{,t'}$ is, for example, the reference coordinate system (X, Y, Z), wherein X5 is, for example, the value of the X-axis, Y5 is, for example, the value of the Y-axis, Z5 is, for example, the value of the Z-axis, and the target vehicle speed V5 is, for example, the speed value of the vehicle.

As shown in FIG. 1, the road surface information acquirer 140 is configured to acquire the road surface information $S4_{,t'}$ of the road surface position at the t'-th future time point. The road surface information S4,t' includes at least one parameter, for example, at least one of a road surface inclination angle Φ1 and a road surface slope Θ1. The angle symbol Θ1 here is, for example, a pitch angle of the road surface, and the angle symbol Φ1 is, for example, a left-right inclination angle of the road surface. The vehicle state estimator 110 may generate the estimated future vehicle state $S1_{,t'}$ at the t'-th future time point based on the road surface information $S4_{,t'}$. For example, the road surface information acquirer 140 obtains the road surface roll angle Φ1 and the road surface gradient Θ1 corresponding to the estimated vehicle position P1, and determines a vehicle posture of the vehicle at the t'-th future time point based on the road surface roll angle Φ1 and the road surface gradient Θ1.

As shown in FIG. 1, the road surface information acquirer 140 captures the road surface information $S4_{,t'}$ of the road surface position at the t'-th future time point, wherein the road surface information $S4_{,t'}$ is obtained from the map data of Global Positioning System (GPS), or by analysis of detection signals from at least one lidar (for example, disposed on the vehicle). In another embodiment, the road surface information $S4_{,t'}$ of the road surface position at the t'-th future time point may be obtained through a road surface information database. In other embodiments, at least one roadside device indirectly or directly transmits the road surface information $S4_{,t'}$ of the surrounding area to the vehicle control system 100 through communication technology.

As shown in FIG. 1, the driving parameter estimation compensation $U_{,t'}$ includes, for example, a control command for at least one parameter, wherein the at least one parameter includes, for example, at least one of a steering wheel angle AN, an accelerator opening TO, and a braking depth BD. Taking the steering wheel angle AN as an example, the vehicle driving straight head may be defined as 0 degrees. The steering wheel angle AN is, for example, the rotation angle of the steering wheel relative to 0 degrees. Taking the accelerator opening TO as an example, the accelerator pedal in a free state (the pedal is not stepped on) may be defined as 0%, the maximum stroke of the accelerator pedal is defined as 100%, and the accelerator opening TO is between 0% and 100%. Taking the braking depth BD as an example, the free state of the brake pedal (without pressing the pedal) may be defined as 0%, the maximum stroke of the brake pedal may be defined as 100%, and the braking depth BD is between 0% and 100%.

As shown in FIG. 1, the convergence determination element 150 is configured to obtain the difference between the target vehicle state $S5_{,t'}$ and the first delayed future vehicle state $S3_{,t'}$. For example, the convergence determination element 150 may obtain the difference value ΔS between the first delayed future vehicle state $S3_{,t'}$ and the target vehicle state $S5_{,t'}$. Furthermore, the convergence determination element 150 obtains a position difference (ΔX, ΔY, ΔZ) between the vehicle target position P5 and the delayed vehicle position P3, and obtains a vehicle speed difference (ΔV) between the target vehicle speed V5 and the delayed vehicle speed V3. The error compensation optimizer 130 determines whether the position difference (ΔX, ΔY, ΔZ) and vehicle speed difference (ΔV) is outside the error range.

If the position difference (ΔX, ΔY, ΔZ) and vehicle speed difference (ΔV) is within the error range, it means that the difference between the first delayed future vehicle state $S3_{,t'}$ and the target vehicle state $S5_{,t'}$ is in line with expectations. The error compensation optimizer 130 generates a control command u corresponding to the first delayed future vehicle state $S3_{,t'}$. The control command u may, for example, be sent to a vehicle computer 10, and the vehicle computer 10 controls the vehicle's steering wheels, the brake and/or the accelerator with the control command u. The control command u includes at least one parameter, for example, at least one of a steering wheel angle an, an accelerator opening to, and a braking depth bd, whose definitions are the same or similar to the aforementioned steering wheel angle AN, the accelerator opening TO, and the braking depth BD.

If the position difference (ΔX, ΔY, ΔZ) and vehicle speed difference (ΔV) is outside the error range, it means that the difference between the first delayed future vehicle state $S3_{,t'}$ and the target vehicle state $S5_{,t'}$ is not as expected, the error compensation optimizer 130 may generate the driving parameter estimation compensation $U_{,t'}$ according to the position difference (ΔX, ΔY, ΔZ) and the vehicle speed difference (ΔV), and transmit the driving parameter estimation compensation $U_{,t'}$ to the vehicle state estimator 110. The estimated future vehicle state $S1_{,t'}$ generated by the vehicle state estimator 110 according to the driving parameter estimation compensation $U_{,t'}$ may be closer to the vehicle target state $S5_{,t'}$. In other words, the estimated future vehicle state $S1_{,t'}$ at the t'-th future time point may go through at least one iteration or update, so that the estimated future vehicle state $S1_{,t'}$ after iteration or update is more closer to the target vehicle state $S5_{,t'}$.

As shown in FIG. 1, the vehicle-side information provider 160 is configured to obtain the current vehicle-side information $S_P$ of the vehicle, which includes, for example, a measurement value of the steering wheel angle, a measurement value of the vehicle speed and/or a measurement value of vehicle location information. The vehicle state estimator 110 is further configured to output the estimated future vehicle state $S1_{,t'}$ at the t'-th future time point according to the current vehicle-side information $S_P$. The inertial sensor 170 is configured to obtain the current motion information $S_I$ of the vehicle, which includes, for example, the vehicle posture (for example, the pitch angle of the vehicle and the left and right inclination angle of the vehicle), the acceleration of the vehicle and/or the angular velocity of the vehicle.

In an embodiment, when the vehicle starts from the power-off state, the vehicle state estimator 110 may obtain the estimated future vehicle state $S1,_{1}$ at the $1^{st}$ future time point by using the current vehicle-side information $S_P$ and/or the current motion information $S_I$. The estimated future vehicle state $S1,_{2}$ at the $2^{nd}$ time point may be obtained based on the estimated future vehicle state $S1,_{1}$ at the $1^{st}$ future time point, and so on, the estimated future vehicle state $S1,_{t'+1}$ at the $(t'+1)^{th}$ future time point may be obtained based on the estimated future vehicle state $S1,_{t'}$ at the t'-th future time point.

In an embodiment, during driving, when the driver changes at least one of the steering wheel angle, the accelerator opening and the braking depth, the vehicle state estimator 110 may obtain the current estimated future vehicle state $S1,_{t}$ by using the current vehicle-side information $S_P$ and/or the current motion information $S_I$. The next estimated future vehicle state $S1,_{t+1}$ may be obtained based on the estimated future vehicle state $S1,_{t'}$.

Figure 2:
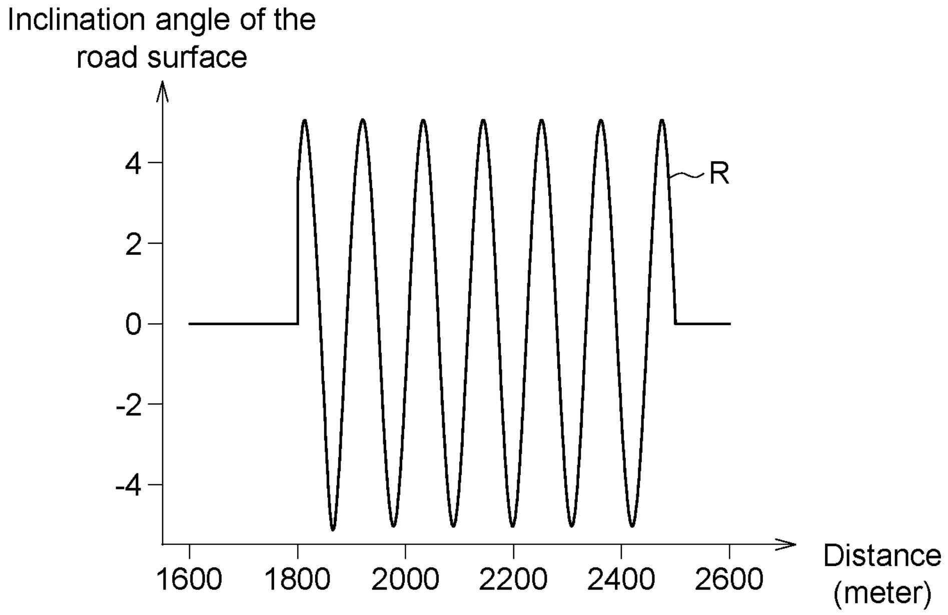
FIG. 2 illustrates a schematic diagram of a variety of a road surface of a road.
Figure 3:
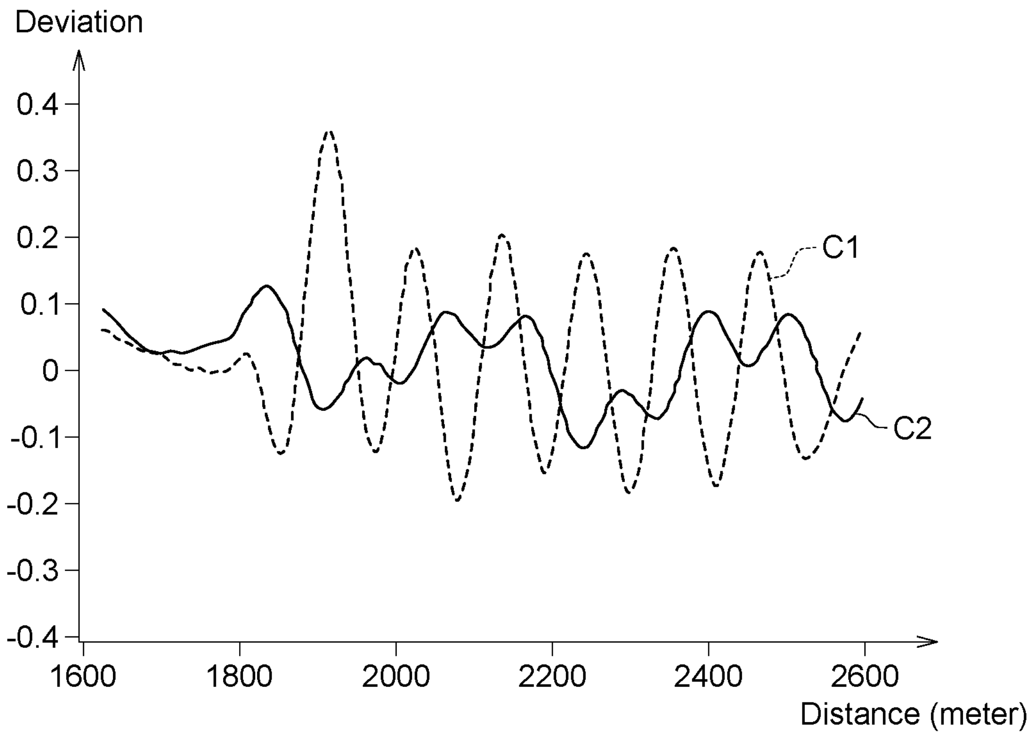
FIG. 3 illustrates a schematic diagram of a deviation of the vehicle which use the vehicle control system in FIG. 1 driving on the road R in FIG. 2.

Referring to FIGS. 2 to 3, FIG. 2 illustrates a schematic diagram of a variety of a road surface of a road R, and FIG. 3 illustrates a schematic diagram of a deviation of the vehicle which uses the vehicle control system 100 in FIG. 1 driving on the road R in FIG. 2.

The horizontal axis shown in FIG. 2 represents a mileage of the road R, while the vertical axis represents the left and right inclination angle of the road surface. As shown in FIG. 3, the horizontal axis represents the mileage of road R, while the vertical axis represents the deviation of the vehicle relative to a road center line. The value of 0 on the vertical axis is defined as the road center line, the value greater than 0 represents that the distance of the vehicle deviating leftward relative to the road center line of the road surface, while the value less than 0 represents that the distance of the vehicle deviating rightward relative to the road center line of the road surface. A curve C1 represents a deviation curve of a conventional vehicle without the vehicle control system 100 driving on the road R in FIG. 2, and a curve C2 represents that the deviation curve of the vehicle using the vehicle control system 100 according to the embodiment of the present disclosure driving on the road R in FIG. 2. Comparing the curves C1 and C2, it may be seen that the vehicle using the vehicle control system 100 in the present embodiment of the disclosure has a smaller degree of deviation when driving on the road. That is, the vehicle using the vehicle control system 100 in the present embodiment of the disclosure may remain on the center line of the lane of the road as much as possible.

Figure 4:
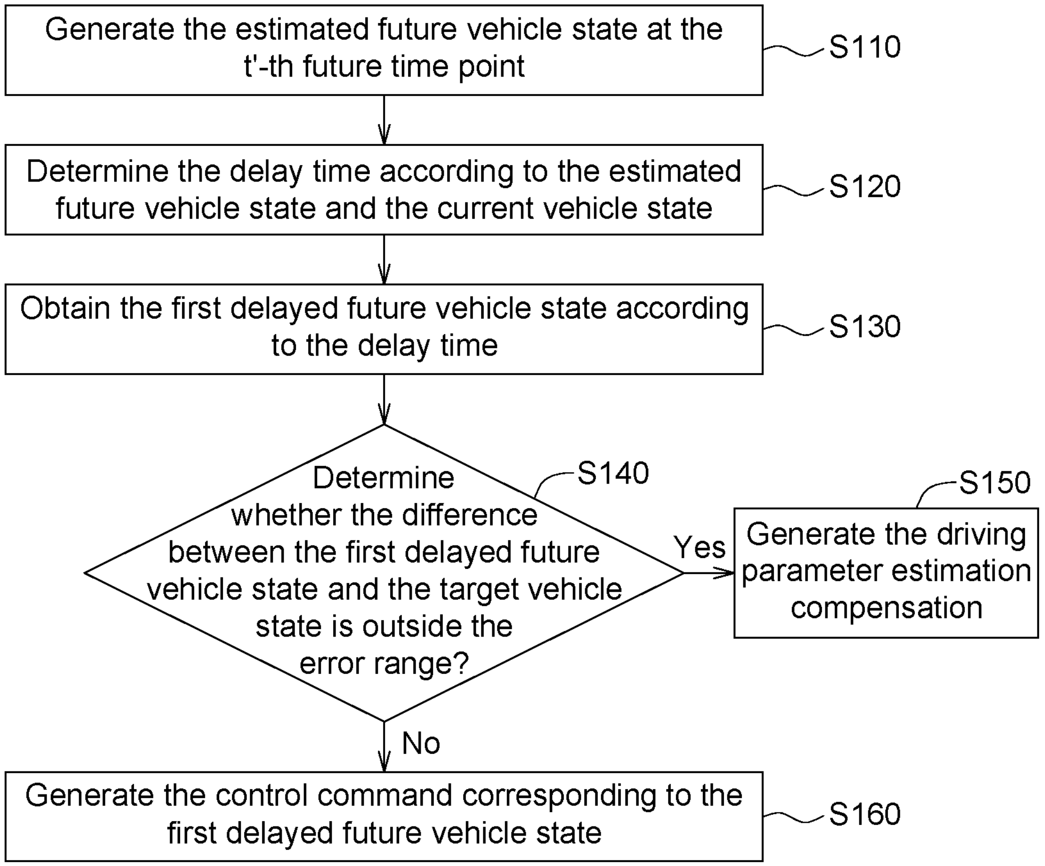
FIG. 4 illustrates a flow chart of the vehicle control method of the vehicle control system in FIG. 1.

Referring to FIG. 4, FIG. 4 illustrates a flow chart of the vehicle control method of the vehicle control system 100 in FIG. 1.

In step S110, Referring to FIG. 1, the vehicle state estimator 110 generates the estimated future vehicle state $S1,_{t'}$ at the t'-th future time point. As illustrated in FIG. 1, when the vehicle starts from the power-off state, the vehicle state estimator 110 may obtain the estimated future vehicle state $S1,_{1}$ at the $1^{st}$ future time point by using the current vehicle-side information $S_P$ and/or the current motion information $S_I$. In other words, the first estimated future vehicle state after the vehicle is started from the power-off state is obtained according to the current vehicle-side information $S_P$ and/or the current motion information $S_I$. The estimated future vehicle state $S1,_{2}$ at the $2^{nd}$ future time point may be obtained according to the estimated future vehicle state $S1,_{1}$ at the $1^{st}$ future time point, and so on, the estimated future vehicle state $S1,_{t'+1}$ at the $(t'+1)^{th}$ future time point may be obtained according to the estimated future vehicle state $S1,_{t'}$ at the t'-th future time point.

In step S120, the delay simulator 120 determines the delay time td according to the estimated future vehicle state $S1,_{t'}$ and the current vehicle state $S2,_{t}$.

In step S130, the delay simulator 120 obtains the first delayed future vehicle state $S3,_{t'}$ according to the delay time td.

In step S140, the error compensation optimizer 130 determines whether the difference between the first delayed future vehicle state $S3,_{t'}$ and the target vehicle state $S5,_{t'}$ is outside the error range; if so, the process proceeds to step S150; if not, the process proceeds Step S160.

In step S150, the error compensation optimizer 130 generates the driving parameter estimation compensation $U,_{t'}$ and transmits the driving parameter estimation compensation $U,_{t'}$ to the vehicle state estimator 110. Then the process returns to step S110, and the vehicle state estimator 110 obtains the updated estimated future vehicle state $S1,_{t'}$ according to the driving parameter estimation compensation $U,_{t'}$.

In step S160, the error compensation optimizer 130 generates a control command u corresponding to the first delayed future vehicle state $S3,_{t'}$, and transmits the control command u to the vehicle state estimator 110.

Figure 5:
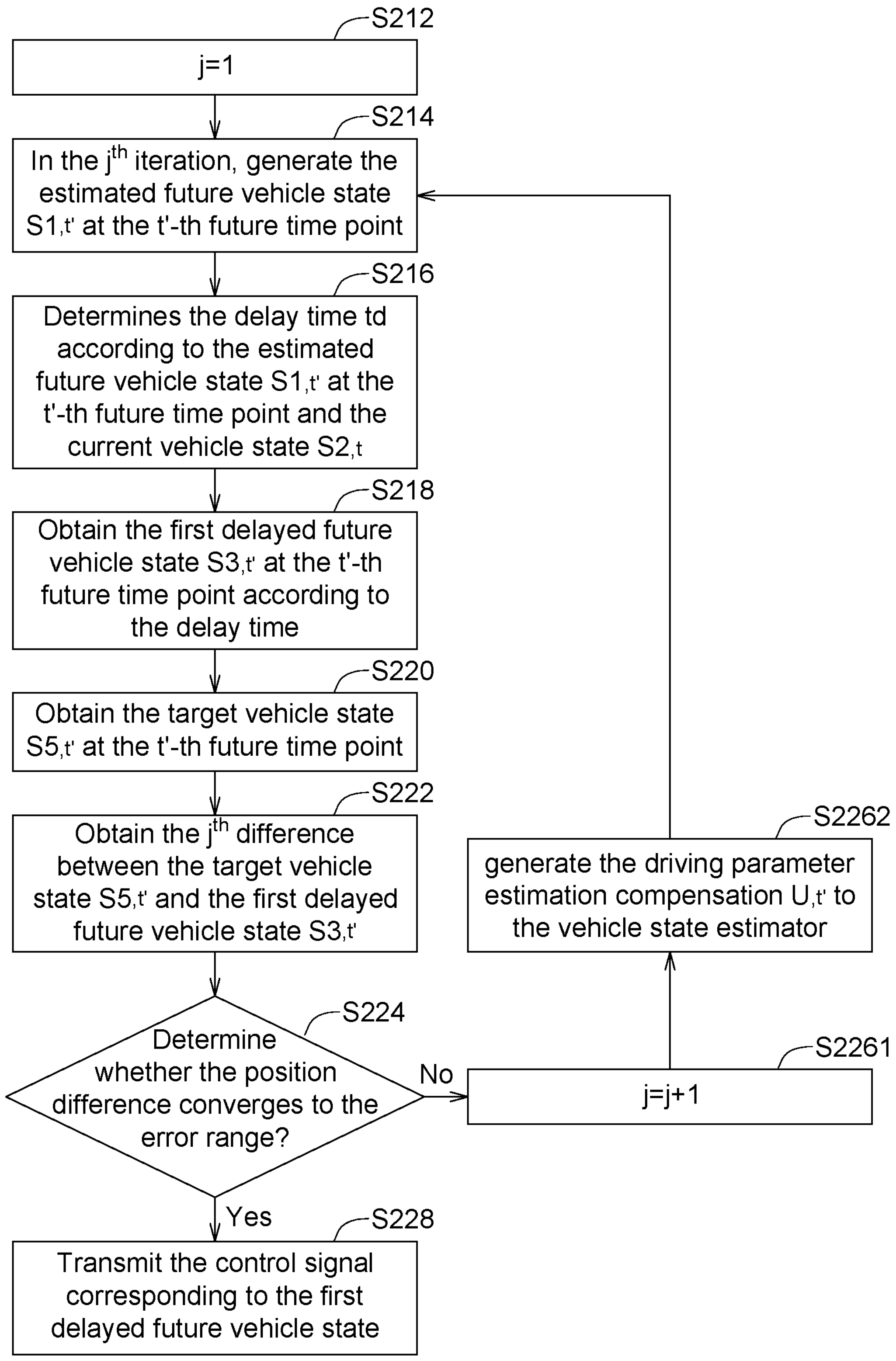
FIG. 5 illustrates a flow chart of the vehicle control method of the vehicle control system of FIG. 1 in another embodiment.

Referring to FIG. 5, FIG. 5 illustrates a flow chart of the vehicle control method of the vehicle control system 100 of FIG. 1 in another embodiment.

In step S212, the vehicle state estimator 110 sets an initial value of j to 1, wherein j is the iteration number.

In step S214, in the $j^{th}$ iteration, the vehicle state estimator 110 generates the estimated future vehicle state $S1,_{t'}$ at the t'-th future time point, wherein t' is a positive integer between 1 and N. For example, the vehicle state estimator 110 generates the estimated future vehicle state group $S1=[S1,_{1}, S1,_{2}, \ldots, S1,_{t'}, \ldots, S1,_{N}]$, wherein $S1,_{1}$ is the estimated future vehicle state at the $1^{st}$ future time point, $S1,_{2}$ is the estimated future vehicle state at the $2^{nd}$ future time point, and so on, $S1,_{t'}$ is the estimated future vehicle state at the t'-th future time point. In other words, in one iteration, the vehicle state estimator 110 generates N estimated future vehicle states $S1,_{t'}$ and performs operations on them.

When the vehicle starts from the power-off state, the vehicle state estimator 110 may obtain the estimated future vehicle state $S1,_{1}$ at the $1^{st}$ (t'=1) future time point by using the current vehicle-side information $S_P$ and/or the current motion information $S_I$. The estimated future vehicle state $S1,_{2}$ at the $2^{nd}$ (t'=2) future time point may be obtained based on the estimated future vehicle state $S1,_{1}$ at the $1^{st}$ future time point, and so on, the estimated future vehicle state $S1,_{t'+1}$ at the $(t'+1)^{th}$ future time point may be obtained according to the estimated future vehicle state $S1,_{t'}$ at the t'-th future time point.

In step S216, the delay simulator 120 determines the delay time td according to the estimated future vehicle state $S1,_{t'}$ at the t'-th future time point and the current vehicle state $S2,_{t}$.

In step S218, the delay simulator 120 obtains the first delayed future vehicle state $S3,_{t'}$ at the t'-th future time point according to the delay time td.

In step S220, the road surface information acquirer 140 obtains the target vehicle state $S5,_{t'}$ at the t'-th future time point according to the estimated vehicle position P1.

In step S222, the convergence determination element 150 obtains the $j^{th}$ difference (in the $j^{th}$ iteration difference) between the target vehicle state $S5,_{t'}$ at the t'-th future time point and the first delayed future vehicle state S3$_{,t'}$. For example, the convergence determination element 150 may obtain the difference ΔS between the first delayed future vehicle state S3$_{,t'}$ and the target vehicle state S5$_{,t'}$ at the t'-th future time point. Furthermore, the convergence determination element 150 obtains the position difference (ΔX, ΔY, ΔZ) between the vehicle target position P5 and the delayed vehicle position P3, and obtains the vehicle speed difference (ΔV) between the target vehicle speed V5 and the delayed vehicle speed V3.

In step S224, the error compensation optimizer 130 determines whether the position difference (ΔX, ΔY, ΔZ) and the vehicle speed difference (ΔV) converge to the error range. For example, compared with the difference ΔS in the previous iteration (that is, $(j-1)^{th}$), whether the difference ΔS in current iteration (that is, $j^{th}$) is reduced and within the error range is determined. If not, it means that the first delayed future vehicle state S3$_{,t'}$ has not yet met the target vehicle state S5$_{,t'}$, and the process proceeds to step S2261. The vehicle state estimator 110 accumulates the value of j (for example, j=j+1) and enters next iteration. If so, it means that the first delayed future vehicle state S3$_{,t'}$ has met the target vehicle state S5$_{,t'}$, and the process proceeds to step S228.

In step S2262, the error compensation optimizer 130 generates the driving parameter estimation compensation U$_{,t'}$ to the vehicle state estimator 110. Then, the process returns to step S214, and by using the driving parameter estimation compensation U$_{,t'}$, the vehicle state estimator 110 may generate the updated estimated future vehicle state S1$_{,t'}$ at the t'-th future time point, so that the vehicle tend to behave as expected.

In step S228, the error compensation optimizer 130 transmits the control signal u corresponding to the first delayed future vehicle state S3$_{,t'}$.

In summary, embodiments of the present disclosure propose a vehicle control system and a vehicle control method thereof. The vehicle control system includes the vehicle state estimator, the delay simulator and the error compensation optimizer. The vehicle state estimator may generate at least one estimated future vehicle state at least one future time point. The delay simulator may determine the delay time according to the estimated future vehicle state and the current vehicle state, and obtain the first delayed future vehicle state according to the delay time. The error compensation optimizer may generate the driving parameter estimation compensation based on the first delayed future vehicle state and the target vehicle state being outside the error range, and may transmit the driving parameter estimation compensation to the vehicle state estimator. As a result, through the driving parameter estimation compensation, the vehicle state estimator may generate the updated estimated future vehicle state at the future time point, so that the vehicle tends to conform to the expected control on the vehicle.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A vehicle control system disposed on a vehicle and comprising:

a vehicle state estimator configured to:

generate an estimated future vehicle state at a future time point;

a delay simulator configured to:

determine a delay time according to the estimated future vehicle state and a current vehicle state; and obtain a first delayed future vehicle state according to the delay time;

an error compensation optimizer configured to:

generate a driving parameter estimation compensation based on a difference between the first delayed future vehicle state and a target vehicle state that is outside an error range, and transmit the driving parameter estimation compensation to the vehicle state estimator.

2. The vehicle control system according to claim 1, wherein the vehicle state estimator is further configured to:

generate an updated estimated future vehicle state according to the driving parameter estimation compensation.

3. The vehicle control system according to claim 1, further comprising:

a road surface information acquirer configured to capture a road surface information of a road surface position;

wherein the vehicle state estimator is further configured to:

obtain the estimated future vehicle state at the future time point according to the road surface information and the driving parameter estimation compensation.

4. The vehicle control system according to claim 1, wherein the delay simulator is further configured to:

perform, according to the delay time, a delay calculation on the estimated future vehicle state to obtain a second delayed future vehicle state;

wherein the error compensation optimizer is further configured to:

generate the driving parameter estimation compensation according to the second delayed future vehicle state and the difference.

5. The vehicle control system according to claim 1, further comprising:

a convergence determination element configured to:

obtain the difference between a target vehicle state and the first delayed future vehicle state.

6. The vehicle control system according to claim 1, wherein the error compensation optimizer is further configured to:

generate a control command corresponding to the first delayed future vehicle state based on the difference between the first delayed future vehicle state and the target vehicle state being within the error range.

7. The vehicle control system according to claim 1, further comprising:

a vehicle-side information provider configured to:

obtain a vehicle-side information of the vehicle;

wherein the vehicle state estimator is further configured to:

obtain the estimated future vehicle state at the $1^{st}$ future time point based on the vehicle-side information when the vehicle is started from a power-off state.

8. The vehicle control system according to claim 1, further comprising:

an inertial sensor configured to:

obtain a motion information of the vehicle;

wherein the vehicle state estimator is further configured to:

obtain the estimated future vehicle state at the $1^{st}$ future time point based on the motion information when the vehicle is started from a power-off state.

9. A vehicle control method of a vehicle control system, comprising:

generating an estimated future vehicle state at a future time point by a vehicle state estimator;

determining a delay time according to the estimated future vehicle state and a current vehicle state by a delay simulator;

obtaining a first delayed future vehicle state according to the delay time by the delay simulator; and generating a driving parameter estimation compensation based on a difference between the first delayed future vehicle state and a target vehicle state that is outside an error range, and transmitting the driving parameter estimation compensation to the vehicle state estimator by an error compensation optimizer.

10. The vehicle control method according to claim 9, further comprising:

generating an updated estimated future vehicle state according to the compensation of the driving parameter by the vehicle state estimator.

11. The vehicle control method according to claim 9, further comprising:

capturing a road surface information of a road surface position by a road surface information acquirer; and obtaining the estimated future vehicle state at the future time point based on the road surface information and the driving parameter estimation compensation by the vehicle state estimator.

12. The vehicle control method according to claim 9, further comprising:

performing a delay calculation on the estimated future vehicle state based on the delay time to obtain a second delayed future vehicle state by the delay simulator; and generating the driving parameter estimation compensation based on the second delayed future vehicle state and the difference by the error compensation optimizer.

13. The vehicle control method according to claim 9, further comprising:

obtaining the difference between a target vehicle state and the first delayed future vehicle state by a convergence determination element.

14. The vehicle control method according to claim 9, further comprising:

generating a control command corresponding to the first delayed future vehicle state based on the difference between the first delayed future vehicle state and the target vehicle state being within the error range by the error compensation optimizer.

15. The vehicle control method according to claim 9, further comprising:

obtaining a vehicle-side information of the vehicle by a vehicle-side information provider; and obtaining the estimated future vehicle state at the $1^{st}$ future time point based on the vehicle-side information by the vehicle state estimator when the vehicle is started from a power-off state.

16. The vehicle control method according to claim 9, further comprising:

obtaining a motion information of the vehicle by an inertial sensor; and obtaining the estimated future vehicle state at the $1^{st}$ future time point based on the motion information by the vehicle state estimator when the vehicle is started from a power-off state.

* * * * *